United States Patent
Prakash et al.

(10) Patent No.: US 12,247,520 B2
(45) Date of Patent: Mar. 11, 2025

(54) WET DRY INTEGRATED CIRCULATION COOLING SYSTEM

(71) Applicant: General Electric Company, Schenectady, NY (US)

(72) Inventors: Rajan Prakash, Bangalore (IN); Sudhakar Todeti, Bangalore (IN)

(73) Assignee: GE Infrastructure Technology LLC, Greenville, SC (US)

(*) Notice: Subject to any disclaimer, the term of this patent is extended or adjusted under 35 U.S.C. 154(b) by 688 days.

(21) Appl. No.: 16/902,794

(22) Filed: Jun. 16, 2020

(65) Prior Publication Data
US 2021/0388765 A1 Dec. 16, 2021

(51) Int. Cl.
*F28F 27/00* (2006.01)
*F02C 7/16* (2006.01)
*F28C 1/14* (2006.01)
*F28D 5/02* (2006.01)

(52) U.S. Cl.
CPC ............ *F02C 7/16* (2013.01); *F28D 5/02* (2013.01); *F05D 2260/213* (2013.01); *F05D 2260/232* (2013.01)

(58) Field of Classification Search
CPC ...... F28D 5/00; F28D 5/02; F28B 1/02; F28B 1/06; F28C 1/00; F28C 1/14; F28F 27/003
See application file for complete search history.

(56) References Cited

U.S. PATENT DOCUMENTS

| | | | |
|---|---|---|---|
| 3,831,667 A | 8/1974 | Kilgore et al. | |
| 4,098,854 A * | 7/1978 | Knirsch | F28C 1/14 261/36.1 |
| 4,296,802 A * | 10/1981 | Larinoff | F28C 1/00 261/DIG. 11 |
| 4,747,980 A * | 5/1988 | Bakay | F28B 1/06 261/153 |
| 5,078,205 A * | 1/1992 | Bodas | F01K 9/003 261/153 |

(Continued)

FOREIGN PATENT DOCUMENTS

| | | |
|---|---|---|
| CN | 102607296 A | 7/2012 |
| CN | 111207603 A | 5/2020 |
| WO | 2004053404 A2 | 6/2004 |

OTHER PUBLICATIONS

Extended European Search Report in EP21176757.9, mailed Nov. 2, 2021, 8 pages.

(Continued)

*Primary Examiner* — Frantz F Jules
*Assistant Examiner* — Jason N Thompson
(74) *Attorney, Agent, or Firm* — Charlotte Wilson; James Pemrick; Hoffman Warnick LLC

(57) ABSTRACT

An integrated circulating water cooling system includes at least one load; an air cooling sub-system; a wet surface cooling sub-system; at least one temperature sensor; a control; and a coolant circulation sub-system for fluidly circulating coolant from the at least one load to the air cooling sub-system to the wet surface cooling sub-system and back to the at least one load. The control selectively operates the wet surface cooling sub-system and the air cooling sub-system based on at least one of temperature sensed in the water circulation sub-system; or sensed ambient temperature.

19 Claims, 1 Drawing Sheet

(56) References Cited

U.S. PATENT DOCUMENTS

| | | | | |
|---|---|---|---|---|
| 5,411,078 | A * | 5/1995 | Ares | F24F 3/1405 |
| | | | | 165/113 |
| 6,142,219 | A * | 11/2000 | Korenic | F28D 5/02 |
| | | | | 261/153 |
| 6,213,200 | B1 * | 4/2001 | Carter | F28D 5/02 |
| | | | | 261/153 |
| 9,091,485 | B2 * | 7/2015 | Bugler, III | F28F 27/003 |
| 10,488,061 | B2 * | 11/2019 | Costakis | F24F 11/83 |
| 2005/0193750 | A1 * | 9/2005 | Carter | F28F 27/00 |
| | | | | 62/171 |
| 2011/0100593 | A1 * | 5/2011 | Benz | F28D 1/0477 |
| | | | | 165/59 |
| 2012/0061055 | A1 | 3/2012 | Bugler et al. | |
| 2013/0269924 | A1 * | 10/2013 | Bugler | F28D 5/02 |
| | | | | 165/96 |
| 2015/0377535 | A1 | 12/2015 | Kono | |
| 2016/0153718 | A1 * | 6/2016 | Batscha | F28B 1/02 |
| | | | | 137/386 |
| 2016/0178262 | A1 | 6/2016 | Rocha et al. | |
| 2017/0268792 | A1 | 9/2017 | Costakis et al. | |
| 2018/0023421 | A1 * | 1/2018 | Wortmann | F01K 3/12 |
| | | | | 60/659 |
| 2020/0300553 | A1 * | 9/2020 | Aaron | F28D 1/0417 |

OTHER PUBLICATIONS

First Office Action in CN202110527350.3, mailed Feb. 20, 2024, 10 pages.

* cited by examiner

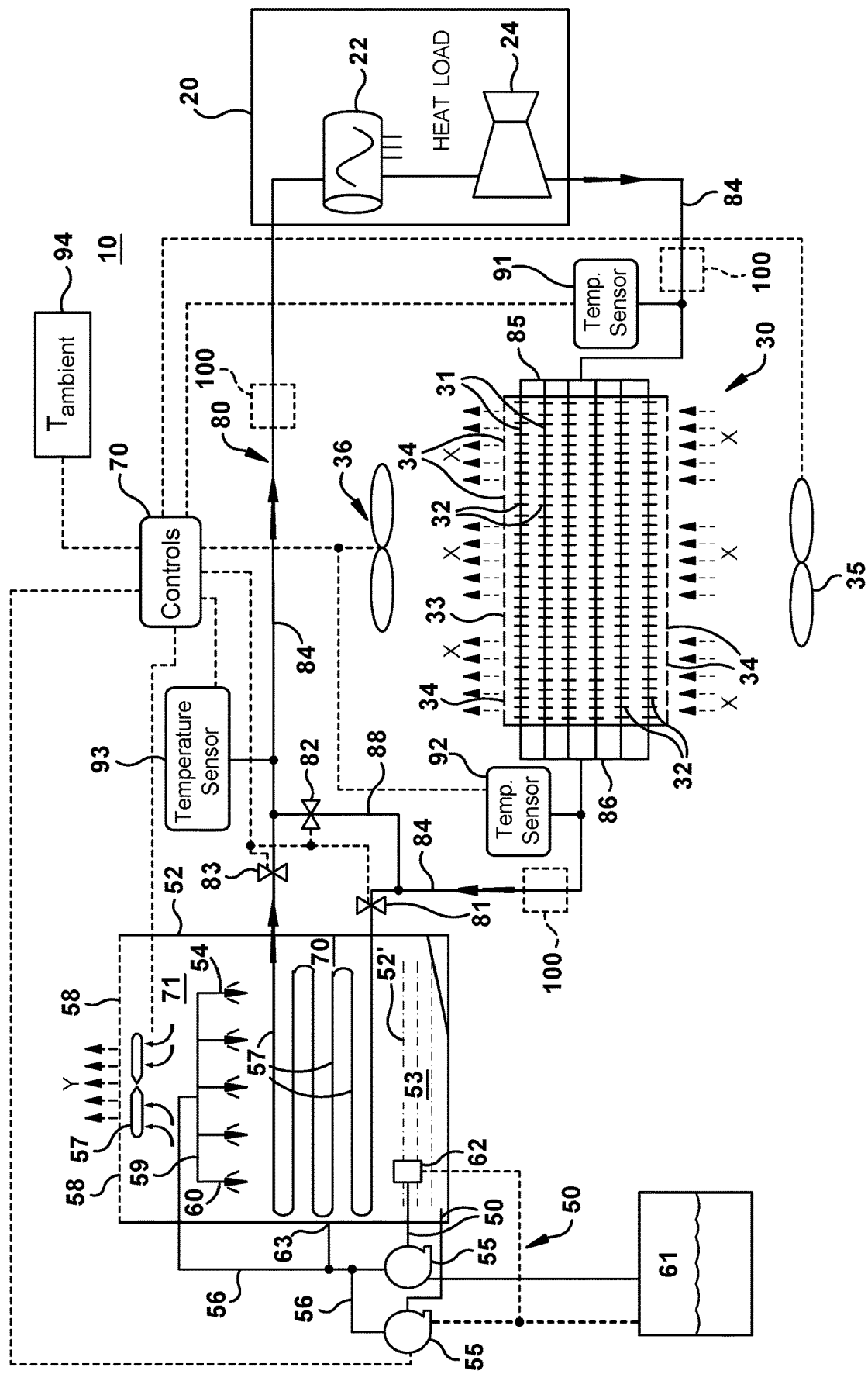

WET DRY INTEGRATED CIRCULATION COOLING SYSTEM

BACKGROUND

The disclosure relates generally to wet dry integrated circulation cooling systems, and more particularly, to a wet dry integrated circulation cooling system with a control for conditional temperature dependent operation of wet dry integrated circulation cooling system components.

BRIEF DESCRIPTION

A first aspect of the disclosure provides an integrated circulating water cooling system that comprises at least one load; an air cooling sub-system; a wet surface cooling sub-system; at least one temperature sensor; a control; and a coolant circulation sub-system for fluidly circulating coolant from the at least one load to the air cooling sub-system to the wet surface cooling sub-system and back to the at least one load. The control selectively operates the wet surface cooling sub-system and the air cooling sub-system based on at least one of temperature sensed in the water circulation sub-system; or sensed ambient temperature.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which:

FIG. 1 illustrates schematic wet dry integrated circulation cooling system, according to embodiments of the disclosure.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION

As an initial matter, in order to clearly describe the current technology it will become necessary to select certain terminology when referring to and describing relevant components within cooling systems, including turbomachine cooling systems. To the extent possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbine engine or, for example, the flow of air through the combustor or coolant through one of the turbine's component systems. The term "downstream" corresponds to the direction of flow of the fluid, and the term "upstream" refers to the direction opposite to the flow.

In addition, several descriptive terms may be used regularly herein, as described below. The terms "first", "second", and "third" may be used interchangeably to distinguish one component from another and are not intended to signify location or importance of the individual components.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Where an element or layer is referred to as being "on," "engaged to," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Turbomachinery systems, their components, and sub-systems often benefit from cooling for enhanced, efficient and prolonged life of the overall system and its individual components and sub-systems. Maintaining cooling of components and sub-systems may enable higher operating temperatures which in turn may augment higher thermal efficiency, may extend component life, and can increase turbomachinery output. Therefore, as discussed herein, controlled operation of an air cooling sub-system and wet surface cooling sub-system with a turbomachine system is useful in providing efficient turbomachine operation, control coolant reserves, and operation flexibility.

Referring now to the drawing in detail, FIG. 1 illustrates a schematic diagram of a wet-dry integrated circulation cooling system 10 in accordance with embodiments of the disclosure. Wet dry integrated circulation cooling system 10 includes a load 20, an (or dry) air cooling sub-system 30, a wet surface cooling sub-system 50 (air cooling sub-system 30 and wet surface cooling sub-system 50 define heat exchangers in wet dry integrated circulation cooling system 10), a control 70, a coolant circulation sub-system 80 where the coolant includes but in no way is intended to be limited to water, and sensors 91, 92, 93. As indicated in FIG. 1, air cooling sub-system 30 and wet surface cooling sub-system 50 are in series.

Coolant fluid, for example water (hereinafter referred to as "water" for ease of description), flows in a circuit through conduits 84 of water circulation sub-system 80. As illustrated, the circuit extends through load 20 to air cooling sub-system 30 and then to wet surface cooling sub-system 50, and then back to load 20. In other words, water circulation sub-system 80 fluidically connects load 20, air cooling sub-system 30, and wet surface cooling sub-system 50 and their components as discussed herein. Flow of water to wet surface cooling sub-system 50 can be controlled by opening and closing valves 81, 82, 83 in water circulation sub-system 80, wherein water circulation sub-system 80 and its components (described hereinafter) are controlled by control 70. Water circulation sub-system 80 includes at least one pump 100 shown in phantom at various possible locations in water circulation sub-system 80 for circulating water therethrough. The at least one pump 100 of water circulation sub-system 80 can be located at any point along conduit 84, for example before or after load 20, before or after air cooling sub-system 30, before or after wet surface cooling sub-system 50, and/or before or after any of valves 81, 82, 83 and/or temperature sensors 91, 92, 93. Further, in accordance with aspects of the disclosure more than one pump 100 for water circulation sub-system 80 can be provided.

Load 20 includes a load that may need cooling for its operation. In particular, as embodied by the disclosure, load 20 can include turbomachinery and/or power plant components. For example, and not intended to limit the disclosure in any manner, load 20 can include at least one of a generator 22 and a turbine 24. Turbine 24 can be a gas turbine, steam turbine or any other device that can generate motive forces, now known or hereinafter developed. Moreover, load 20 can also include heat recovery steam generators, gas driers, compressors, heat exchangers, and other load devices, now known or hereinafter developed that may need cooling.

Air cooling sub-system 30 is a dry cooling sub-system that includes a fin cooler, such as but not limited to, a finned-tube bundle with multiple parallel rows of finned tubes 31 in a series. Water from water circulation sub-system 80 flows to air cooling sub-system 30. Water is divided at manifold 85 of water circulation sub-system 80 to finned tubes 31. Air cooling sub-system 30 includes a housing 33 supporting finned tubes 31 in spaced relationship, such as but not limited to, parallel rows. Housing 33 is open to atmosphere and permits air flow in and out (see arrows X) of housing 33 and across finned tubes 31.

Air cooling sub-system 30 includes an active cooling mode, where one or more fans 35, 36 move air across finned tubes 31. If fan 35 blows air upwards (in the plane of FIG. 1), air cooling sub-system 30 is a forced air cooling sub-system 30. If fan 36 is employed to pull air up through housing 33, the sub-system is referred to as an induced air cooling sub-system system 30. Fan(s) 35, 36 are used to move ambient air over finned tubes 31 to cool water being circulated through tubes 31 transferring heat to the ambient air. Thus, the temperature of water in water circulation sub-system 80 as water passes through air cooling sub-system 30 can be lowered. Water exits air cooling sub-system 30 and is rejoined into water circulation sub-system 80 at manifold 86. If fan(s) 35, 36 are directed by control 70 not to operate, in other words be in an "off" condition, no active cooling will be completed at air cooling sub-system 30. However, in the "off" condition, heat may dissipate via normal thermodynamic principles out of fins of finned tubes 31, albeit to a lesser extent than provided by active cooling with fan(s) 35, 36 operating.

From manifold 86, water flows in conduit 84 of water circulation sub-system 80 towards wet surface cooling sub-system 50. Before reaching wet surface cooling sub-system 50, the flow of water can be controlled by opening and/or closing values 81. The operation of valves 81, 82, 83 is controlled by control 70, as described hereinafter. If valves 81, 83 are open and valve 82 is closed, flow is directed into wet surface cooling sub-system 50. Alternatively, manual isolation valves can also be used in place of controls operated valves.

Wet surface cooling sub-system 50 includes two separate heat exchange portions 70 and 71 and 7. Each heat exchange portion will effectively extract heat of coolant water. Heat exchange portion 5 of wet surface cooling sub-system 50 includes housing 52 with a plurality of serpentine tubes 51 extending therethrough. The tubes 52 are so arranged with respect to water circulation sub-system 80 so liquid coolant, generally water, flows through serpentine tubes 51 from conduit 84, after passing through valve 81, if the control 70 has opened valves 81, 83 and closed valve 82, as described herein.

Heat exchange portion 7 of wet surface cooling sub-system 50 includes a spray distributor 54, which atomizes liquid, in this case liquid condensate 53. Liquid condensate 53 is liquid that spray distributor 54 distributes over plurality of serpentine tubes 51 to dissipate heat from water in serpentine tubes 51. After passing on, around, and through serpentine tubes 51, sprayed liquid settles in housing 52 in a reservoir 52' as liquid condensate 53. Serpentine tubes 51 provide a large surface area so that when liquid condensate 53 from spray distributor 54 comes in contact with serpentine tubes 51, it absorbs heat therefrom.

A portion of liquid condensate 53 is circulated by pumps 55 through wet surface cooling sub-system piping 56 to direct condensate liquid 53 to spray distributor 54. The spray from spray distributor 54 contacts serpentine tubes 51 to promote cooling, as noted herein.

FIG. 1 illustrates two pumps 55, however only one pump 55, or more than two pumps, may be provided and/or operated with wet surface cooling sub-system piping 56, in accordance with aspects of the disclosure. Wet surface cooling sub-system piping 56 is connected to pump(s) 55 that pulls liquid condensate 53 from housing reservoir 52'. From pump(s) 55 wet surface cooling sub-system piping 56 delivers liquid condensate 53 to manifold 59 and then to spray heads 60. Provision of two pumps 55, or more than two pumps, enables faster movement of liquid condensate 53 and control the flow requirement based on temperature sensed in the system by control 70.

Spray distributor 54 includes at least one and preferably a plurality of spray heads 60 that are fed from a manifold 59 of wet surface cooling sub-system piping 56 and pump(s) 55. FIG. 1 shows one manifold 59 with five (5) spray heads 60; however, this configuration is merely illustrative of aspects of the disclosure. Moreover, noting the restrictions of two-dimensional figures, aspects of the embodiment include, but are not limited to one, two, or more manifolds 59. Further, another aspect of the disclosure includes a single spray head 60 per manifold 59, or two spray heads 60 per manifold 59, or more than two spray heads per manifold 59. Additionally, the number of spray heads 60 per manifold 59 need not be equal per manifold 59. For example, and in no way intended to limit the embodiments in any manner, one manifold may have five (5) spray heads 60 (as illustrated) and subsequent manifolds 59 may have the same or different numbers of spray heads 60 thereon.

Wet surface cooling sub-system 50 includes at least one fan 57 for drawing air (and possibly steam) that has had heat extracted therefrom from water circulation sub-system 80. Housing 52 includes openings 58 proximate fan 57, so air being moved by fan 57 can escape housing and wet surface cooling sub-system 50.

Wet surface cooling sub-system 50 also includes a reserve water supply 61, which provides water for wet surface cooling sub-system 50 if evaporation of condensate liquid 53 in reservoir 52' occurs to a degree where considerate liquid 53 is in need of replenishment. A level control valve 62 is disposed on wet surface cooling sub-system piping 56 in housing 52, so if condensate liquid 53 in housing reservoir 52' falls below a predetermined level, a signal from level control valve 62 signals control 70 to operate pump(s) 55 to transfer water from makeup water supply 61 into housing 52, for example through an opening 63 into housing reservoir 52' through wet surface cooling sub-system piping 56. Alternatively, level control valve 62 signals control 70 to operate pump(s) 55 to transfer water from makeup water supply 61 into housing 52, for example through wet surface cooling sub-system piping 56 to manifold 59 and spray heads 60.

Air cooling sub-system 30 is disposed upstream of wet surface cooling sub-system 50 so that wet surface cooling sub-system 50 has a portion of water circulation sub-system 80 which may have had its liquid cooled to a certain degree by air cooling sub-system 30. Therefore, wet surface cooling sub-system 50 is able to further extract heat from water in water circulation sub-system 80. Operation of pump(s) in water circulation sub-system 80 can be controlled (as described herein) to efficiently, and only as needed, provide liquid condensate 53 to wet surface cooling sub-system 50.

Control 70 is connected to elements of the water circulation sub-system 80. Control 70 is connected to temperature sensors 91, 92, 93 of water circulation sub-system 80. Control 70 is connected to pump(s) 100 to move coolant in water circulation sub-system 80. Moreover, control 70 is connected to valves 81, 82, 83 of water circulation sub-system 80 for permitting or stopping flow of water through those portions of water circulation sub-system 80, as described herein. Further, control 70 is connected to pump(s) 55 to control water flow and liquid condensate 53 levels in wet surface cooling sub-system 50. Additionally, control 70 is connected to pump(s) 55 and float valve 62 to add makeup water from reserve water supply 61, if a level of liquid condensate 53 in housing reservoir 52' falls below a predetermined level.

Temperature sensors 91 and 92 are disposed before and after air cooling sub-system 30 and provide data on temperatures of water in water circulation sub-system 80 before and after air cooling sub-system 30. Control 70 is also connected to fan(s) 35, 36 of air cooling sub-system 30 to control speeds of fan(s) 35, 36 and their operation. Accordingly, as desired and necessitated by temperatures that are sensed by sensors 91 and 92, control 70 can operate bottom fan 35 to force air upwardly so air cooling sub-system 30 is a forced air cooling sub-system air cooling sub-system 30, or operate fan 36 to pull air up through housing 33, so air cooling sub-system 30 is an induced air cooling sub-system 30. If desired, control 70 can operate both fans 35, 36 for enhanced cooling by air cooling sub-system 30.

Temperature sensors 92, 93 respectively are positioned before and after wet surface cooling sub-system wet surface cooling sub-system 50. Temperature sensors 92, 93 provide data to control 70 indicating if wet surface cooling sub-system 50 is effectively working to cool water in water circulation sub-system 80. As noted above, two pumps 55 may be provided in wet surface cooling sub-system 50 with wet surface cooling sub-system piping 56. By providing data from sensors 92, 93, control 70 can operate one, two, or more (if provided) pumps 55 for wet surface cooling sub-system 50. This configuration permits one or more pump(s) 55 for spray distributor 54. Accordingly, based on data from temperature sensor 92 before wet surface cooling sub-system 50, control 70 can run necessary pumps 55 and limit makeup water requirements.

Control 70 is also connected to a temperature sensor 94 that senses ambient temperature. In low ambient temperature periods when cooling water inlet temperature to wet surface cooling sub-system 50 is lower than needed or required cooling water temperature for load 20, control 70 operates to cease operation of wet surface cooling sub-system sub-system 50 for cooling water in water circulation sub-system 80. Thus, control 70 instructs valves 81, 83 to close and valve 82 to open. Accordingly, water in water circulation sub-system 80 is directed to by-pass conduit 88, not passing through wet surface cooling sub-system sub-system 50, and is returned via water circulation sub-system 80 to load 20. Thus, one or more pump(s) 55 and spray distributor 54, as well as fan 58 in wet surface cooling sub-system 50 may be in an off, stand-by, and inoperative mode. These elements will remain in that mode until control 70 senses an ambient temperature at sensor 94 and a water temperature at sensors 92, 93 before and after wet surface cooling sub-system 50 that indicates load 20 needs cooler coolant in water circulation sub-system 80.

Once that need for cooler water for load 20 is determined by control 70, control 70 will reinitiate operation of wet surface cooling sub-system 50 and open valves 81, 83, closing valve 82. Thus, a series cooling flow from load 20 to air cooling sub-system 30 to wet surface cooling sub-system 50 and back to heat load 20 is initiated.

A further aspect of the disclosure, enables control 70 to halt operation of fan(s) 35, 36 of air cooling sub-system 30 so water in water circulation sub-system 80 merely passes through air cooling sub-system 30 in housing 33. Here, no active cooling is done by air cooling sub-system air cooling sub-system 30. Wet surface cooling sub-system 50 alone performs the active cooling of water in water circulation sub-system 80. Of course, control 70 can initiate operation of fan(s) 35, 36 of air cooling sub-system 30 as needed depending on cooling needed by load 20 and/or high ambient temperature periods sensed by sensor 94.

An aspect of the disclosure provides control 70 as a stand-alone system. Alternatively, control 70 may be integrated as a module, or the like, within a broader system, such as a turbine control or a plant control system. For example, but not limiting of, control 70 may be integrated with a control system operating the overall power plant in which the wet dry integrated cooling system is installed.

Control 70, as embodied by the disclosure, can also be provided as any combination of one or more computer usable or computer readable medium(s). The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Approximately" as applied to a particular value of a range applies to both end values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. An integrated circulating water cooling system for at least one load, the system comprising:
    an air cooling sub-system that is a dry cooling sub-system that includes a first housing supporting a cooler, a first fan above the cooler, and a second fan below the cooler, the first fan and the second fan being selectively operable to draw air into and through the air cooling sub-system and to force air into and through the air cooling sub-system, respectively;
    a wet surface cooling sub-system that includes a second housing and a plurality of tubes that extend through the second housing;
    at least one temperature sensor;
    a control; and
    a coolant circulation sub-system for fluidly circulating coolant from the at least one load to and through the air cooling sub-system then to the wet surface cooling sub-system and then back to the at least one load via a first conduit downstream of and fluidly connecting the wet surface cooling sub-system to the at least one load, the coolant circulation sub-system including a by-pass conduit upstream of the wet surface cooling sub-system and in fluid communication with the first conduit, the coolant circulation sub-system further including a first valve between the by-pass conduit and an inlet of the wet surface cooling sub-system, wherein the first valve is connected to the control;
    wherein the control selectively operates at least one of the wet surface cooling sub-system and the air cooling sub-system based on at least one of:
        temperature sensed in the coolant circulation sub-system; and
        sensed ambient temperature;
    wherein the control operates just the air cooling sub-system by closing the first valve to bypass the wet surface cooling sub-system if a sensed temperature of coolant to the wet surface cooling sub-system is lower than a coolant temperature needed by the at least one load; and
    wherein the control operates the first fan of the air cooling sub-system to force air through the air cooling sub-system, the second fan of the air cooling sub-system to pull air through the air cooling sub-system, or both the first fan of the air cooling sub-system and the second fan of the air cooling sub-system responsive to at least one of the sensed ambient temperature or the temperature sensed in the coolant circulation sub-system.

2. The system of claim 1, wherein the control selectively operates the wet surface cooling sub-system and the air cooling sub-system together.

3. The system of claim 1, wherein the control selectively operates just the wet surface cooling sub-system.

4. The system of claim 3, wherein the control selectively operates just the wet surface cooling sub-system by turning off the first fan and the second fan of the air cooling sub-system.

5. The system of claim 1, wherein the at least one temperature sensor includes sensors in the coolant circulation sub-system providing coolant temperature signals to the control.

6. The system of claim 5, wherein the sensors are located in the coolant circulation sub-system before and after the air cooling sub-system, before and after the wet surface cooling sub-system, and after the at least one load, providing temperature signals to the control.

7. The system of claim 5, wherein the sensors include three sensors in the coolant circulation sub-system, a first sensor located after the at least one load but before the air cooling sub-system, a second sensor located after the air cooling sub-system but before the wet surface cooling sub-system, and a third sensor located after the wet surface cooling sub-system but before the at least one load.

8. The system of claim 1, wherein the at least one temperature sensor includes an ambient temperature sensor providing ambient temperature signals to the control.

9. The system of claim 1, further including a second valve in the coolant circulation sub-system between the by-pass conduit and the first conduit, the second valve being connected to the control, the control sending signals to open and close the second valve permitting coolant flow to and from the by-pass conduit to the first conduit.

10. The system of claim 1, wherein the control selectively operates just the air cooling sub-system if a sensed ambient temperature is lower than the coolant temperature needed by the at least one load.

11. The system of claim 1, further including at least one pump to circulate coolant through the coolant circulation sub-system.

12. The system of claim 1, wherein the wet surface cooling sub-system further includes:
   a reserve coolant supply,
   a wet surface cooling sub-system piping including at least one pump and a level control valve, and
   a condensate liquid reservoir,
   wherein a signal from the level control valve signals the control to operate the at least one pump to transfer coolant from the reserve coolant supply into the condensate liquid reservoir.

13. The system of claim 12, wherein the at least one pump of the wet surface cooling sub-system piping includes a plurality of pumps connected to the control.

14. The system of claim 1, wherein the plurality of tubes of the wet surface cooling sub-system includes a plurality of serpentine tubes fluidically connected to the coolant circulation sub-system; and wherein the wet surface cooling sub-system further includes a heat exchanger portion, the heat exchanger portion including a spray distributor to spray coolant on the plurality of serpentine tubes for reducing the temperature of coolant in the coolant circulation sub-system.

15. The system of claim 14, wherein the spray distributor further includes at least one manifold, the at least one manifold including a plurality of spray heads to spray coolant on the plurality of serpentine tubes.

16. The system of claim 1, wherein the cooler of the air cooling sub-system includes a fin cooler, the fin cooler including a finned-tube bundle with multiple rows of finned tubes.

17. The system of claim 1, wherein the wet surface sub-system includes a third fan arranged to draw air through the second housing and over the plurality of tubes that extend through the second housing.

18. The system of claim 17, wherein the control operates the third fan of the wet surface cooling sub-system to draw air through the wet surface cooling sub-system responsive to at least one of the sensed ambient temperature or the temperature sensed in the coolant circulation sub-system.

19. The system of claim 18, wherein the control selectively operates the third fan of the wet surface cooling sub-system responsive to at least the temperature sensed in the coolant circulation sub-system.

\* \* \* \* \*